(12) United States Patent
Kuwahara

(10) Patent No.: US 11,318,930 B2
(45) Date of Patent: May 3, 2022

(54) PARKING ASSISTANCE DEVICE AND PARKING ASSISTANCE METHOD

(71) Applicant: CLARION CO., LTD., Saitama (JP)

(72) Inventor: Toshihisa Kuwahara, Saitama (JP)

(73) Assignee: CLARION CO., LTD., Saitama (JP)

( * ) Notice: Subject to any disclaimer, the term of this patent is extended or adjusted under 35 U.S.C. 154(b) by 62 days.

(21) Appl. No.: 16/810,165

(22) Filed: Mar. 5, 2020

(65) Prior Publication Data

US 2020/0290600 A1    Sep. 17, 2020

(30) Foreign Application Priority Data

Mar. 11, 2019   (JP) .............................. JP2019-043490

(51) Int. Cl.
*B60W 30/06*    (2006.01)
*G06V 20/58*    (2022.01)
*G06V 20/56*    (2022.01)

(52) U.S. Cl.
CPC ........... *B60W 30/06* (2013.01); *G06V 20/586* (2022.01); *G06V 20/588* (2022.01); *B60W 2420/42* (2013.01); *B60W 2552/53* (2020.02)

(58) Field of Classification Search
CPC ............ B60W 30/06; B60W 2552/53; B60W 2420/42; B60W 40/02; G06K 9/00798; G06K 9/00812; G06K 9/4604; B62D 15/0285; B62D 15/0275; B60R 2300/806; B60T 2201/10
See application file for complete search history.

(56) References Cited

U.S. PATENT DOCUMENTS

| | | | |
|---|---|---|---|
| 2016/0203377 A1* | 7/2016 | Irie | H04N 5/232945 348/118 |
| 2016/0343139 A1* | 11/2016 | Diegmann | G06T 7/12 |
| 2018/0099661 A1* | 4/2018 | Bae | B60W 30/06 |
| 2018/0162446 A1* | 6/2018 | Mikuriya | B62D 15/024 |
| 2018/0345955 A1 | 12/2018 | Kim et al. | |
| 2018/0370566 A1* | 12/2018 | Kojo | G06K 9/00812 |

FOREIGN PATENT DOCUMENTS

| | | |
|---|---|---|
| CN | 109284731 A | 1/2019 |
| EP | 3421328 A1 | 1/2019 |
| JP | 2013-216305 A | 10/2013 |

OTHER PUBLICATIONS

Extended European Search Report issued for the counterpart European Patent Application No. 20159710.1-1009.

* cited by examiner

*Primary Examiner* — Kenneth J Malkowski
(74) *Attorney, Agent, or Firm* — IP Business Solutions, LLC

(57) ABSTRACT

A parking assistance device includes: a marking line detector that detects a plurality of marking lines delineating a parking area from an image taken by an imaging unit; a second determiner that determines whether or not the type of parking for parking a vehicle in a parkable area is angle parking, on the basis of the angle obtained between a parking baseline joining the endpoints on the vehicle side of the detected plurality of marking lines and the plurality of marking lines, or the angle obtained between the parking baseline and one marking line selected from among the plurality of marking lines; and a parking position setter that, in the case where the second determiner determines that the type of parking corresponds to angle parking, sets a parking position inside the parkable area in which to park the vehicle, on the basis of the parking baseline.

6 Claims, 15 Drawing Sheets

PARKING ASSISTANCE DEVICE AND PARKING ASSISTANCE METHOD

INCORPORATION BY REFERENCE

The present application claims priority under 35 U.S.C. § 119 to Japanese Patent Application No. 2019-043490 filed on Mar. 11, 2019. The content of the applications is incorporated herein by reference in its entirety.

BACKGROUND OF THE INVENTION

Field of the Invention

The present invention relates to a parking assistance device and a parking assistance method.

Description of the Related Art

In the related art, a parking assistance device that assists the driver with parking maneuvers is known. The parking assistance device creates a travel route from the current position of a car to a parking position designated as a goal, and assists the driver with parking maneuvers such that the vehicle drives along the travel route. Also known is a technology that detects a parking space where the vehicle is parkable on the basis of an image from a camera. For example, Japanese Unexamined Patent Application Publication No. 2013-216305 discloses a vehicle parking space recognition method that includes: an angle capturing step of capturing angular portions from an image; an intersection capturing step of combining adjacent angular portions among the captured angular portions to capture intersection points; a slot capturing step of combining captured intersection points to capture slots, each slot being an outline of a parking space; a type selecting step of selecting a type of parking space from the captured slots; and a final selecting step of selecting a final slot on the basis of the selected type.

SUMMARY OF THE INVENTION

However, in the case where a parking area detected from a camera image is a parking area for angle parking, even if the vehicle is parked by self-driving in the parking area detected from the camera image, the front edge or rear edge of the vehicle may stick out from the parking area in some cases. Angle parking refers to a type of parking in which a vehicle is parked such that the longitudinal direction of the vehicle is oriented diagonally with respect to the lane that the parking area faces. If a vehicle is parked with the front edge or rear edge sticking out from the parking area, in some cases, the vehicle may become an obstacle to people walking in the lane or to another vehicle driving in the lane to park in the parking area.

In view of the circumstances described above, an object of the present invention is to enable a vehicle to be parked without sticking out from the parking area, even in the case of performing angle parking by self-driving.

A parking assistance device according to an aspect of the present invention that attains the above object is provided with: an imaging unit, installed in a vehicle, that takes an image of a road surface around the vehicle; a marking line detector that detects a plurality of marking lines delineating a parking area from the image taken by the imaging unit; a determiner that determines whether or not a type of parking for parking the vehicle in the parking area is angle parking, on a basis of an angle obtained between a line segment joining endpoints on a vehicle side of the detected plurality of marking lines and the plurality of marking lines, or an angle obtained between the line segment joining the endpoints and one marking line selected from among the plurality of marking lines; and a parking position setter that sets a parking position inside the parking area for parking the vehicle on a basis of the line segment in a case where the determiner determines that the type of parking is angle parking.

In the above parking assistance device, the parking position setter sets the parking position inside the parking area delineated by the marking lines at a position farther away from the vehicle than the line segment.

In the above parking assistance device, in a case where the angle obtained between the line segment joining the endpoints on the vehicle side and the marking lines is at least 45° and not more than 60°, the determiner determines that the type of parking is angle parking that parks the vehicle back-in at an angle, and in a case where the angle obtained between the line segment joining the endpoints on the vehicle side and the marking lines is at least 120° and not more than 135°, the determiner determines that the type of parking is angle parking that parks the vehicle nose-in at an angle.

The above parking assistance device further includes a driving controller that automatically drives the vehicle. The parking position setter detects, on a basis of the image taken by the imaging unit, a distance between the vehicle and an other vehicle parked in an opposite parking area to the parking area across a lane where the vehicle is positioned, and decides a driving area for parking the vehicle in the parking area on a basis of a distance between the line segment and the other vehicle parked in the opposite parking area, and the driving controller drives the vehicle inside the driving area set by the parking position setter, and parks the vehicle at the parking position.

A parking assistance method according to an aspect of the present invention includes: taking an image of a road surface around a vehicle with an imaging unit installed in the vehicle; detecting a plurality of marking lines delineating a parking area from the image taken by the imaging unit; determining whether or not a type of parking for parking the vehicle in the parking area is angle parking, on a basis of an angle obtained between a line segment joining endpoints on a vehicle side of the detected plurality of marking lines and the plurality of marking lines, or an angle obtained between the line segment joining the endpoints and one marking line selected from among the plurality of marking lines; and setting a parking position inside the parking area for parking the vehicle on a basis of the line segment in a case of determining that the type of parking into the parking area is angle parking.

In the setting step of the above parking assistance method, the parking position is set inside the parking area delineated by the marking lines at a position farther away from the vehicle than the line segment.

In the determining step of the above parking assistance method, in a case where the angle obtained between the line segment joining the endpoints on the vehicle side and the marking lines is at least 45° and not more than 60°, the type of parking is determined to be angle parking that parks the vehicle back-in at an angle, and in a case where the angle obtained between the line segment joining the endpoints on the vehicle side and the marking lines is at least 120° and not more than 135°, the type of parking is determined to be angle parking that parks the vehicle nose-in at an angle.

In the setting step of the above parking assistance method, a distance between the vehicle and an other vehicle parked in an opposite parking area to the parking area across a lane where the vehicle is positioned is detected on a basis of the image taken by the imaging unit, and a driving area for parking the vehicle in the parking area is decided on a basis of a distance between the line segment and the other vehicle parked in the opposite parking area. The parking assistance method further includes self-driving the vehicle inside the driving area set in the setting step, and parking the vehicle at the parking position.

According to an aspect of the present invention, a vehicle can be parked without sticking out from the parking area, even in the case of performing angle parking by self-driving.

DETAILED DESCRIPTION OF THE PREFERRED EMBODIMENTS

Hereinafter, an embodiment of the present invention will be described with reference to the attached drawings.

Figure 1:
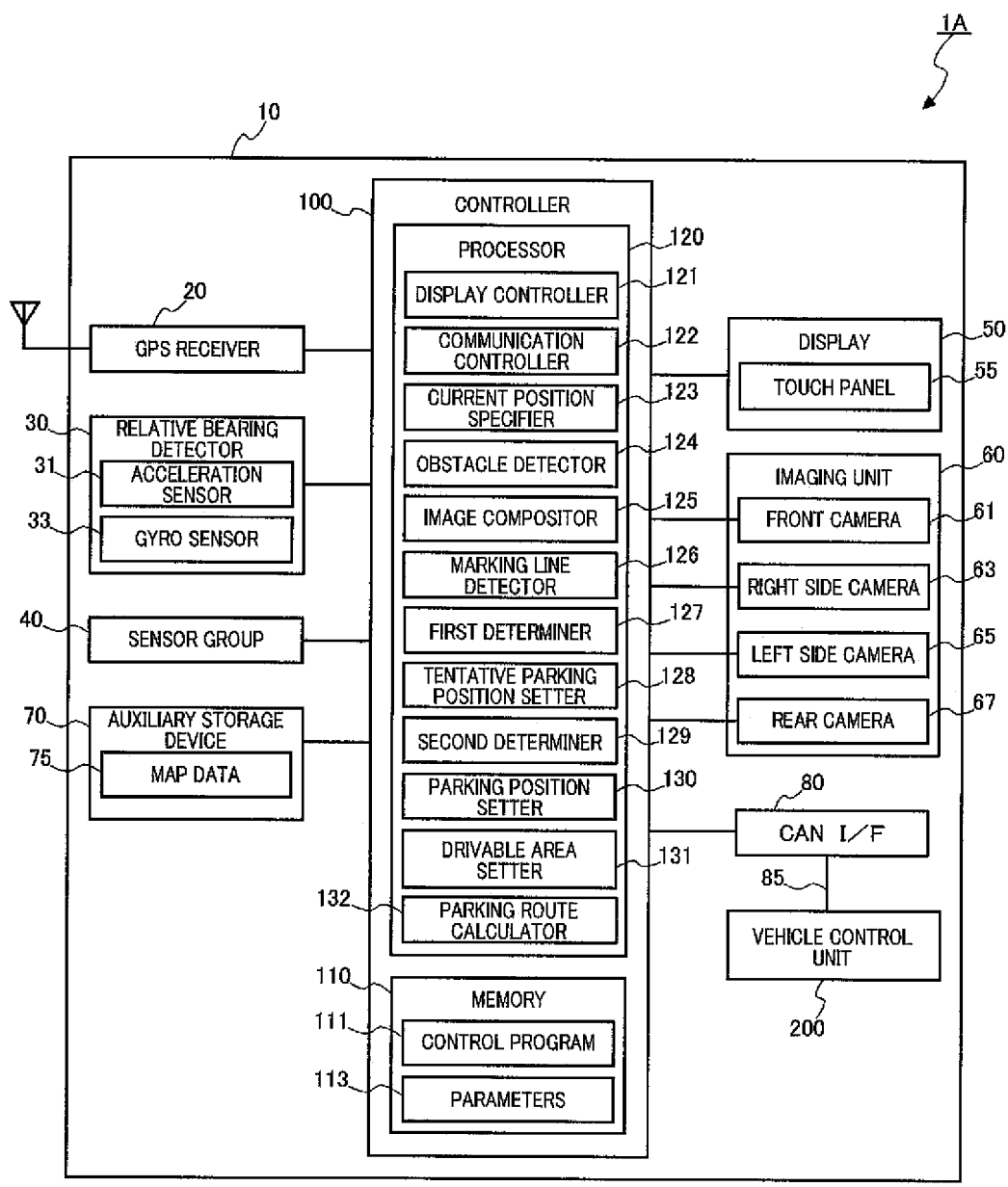
FIG. 1 is a block diagram illustrating a configuration of a parking assistance device.

FIG. 1 is a block diagram illustrating a configuration of a parking assistance device 10. In the following, the vehicle equipped with the parking assistance device 10 is referred to as the "vehicle 1A", while any vehicle other than the vehicle 1A is referred to as the "other vehicle 1B".

The vehicle 1A is a vehicle that is driven according to driving maneuvers by a driver, and is also capable of self-driving by computer control without having the driver perform driving maneuvers. Also, the vehicle 1A is a vehicle such as an engine-driven four-wheeled vehicle, a motor-driven electric vehicle, or a hybrid vehicle equipped with a motor and an engine, for example. The vehicle 1A may also be a vehicle other than a four-wheeled vehicle.

The vehicle 1A is equipped with the parking assistance device 10.

The parking assistance device 10 is a device that detects a parkable area 160 where the vehicle 1A can be parked in a parking lot, and calculates a movement route for driving the vehicle 1A to the detected parkable area 160 by self-driving. The parkable area 160 refers to an area where the other vehicle 1B or the like is not parked and the vehicle 1A can be parked from among parking areas delineated by marking lines 150 (see FIG. 2) such as white lines. Also, the term "parking area" is used to refer to areas including cases where the other vehicle 1B or the like is already parked.

A configuration of the parking assistance device 10 will be described.

The parking assistance device 10 may be configured as a dedicated device, as part of the functions of a navigation device having navigation functions, or as part of the functions of a control device that controls self-driving.

The parking assistance device 10 is provided with a controller 100, a GPS receiver 20 connected to the controller 100, a relative bearing detector 30, a sensor group 40, a display 50, an imaging unit 60, an auxiliary storage device 70, and a vehicle control unit 200.

The GPS receiver 20 receives GPS signals transmitted from GPS satellites through a GPS antenna 21. By measuring the distance and rate of distance change between the vehicle 1A and the GPS satellites for a predetermined number of satellites or more on the basis of the received GPS signals, the GPS receiver 20 calculates the absolute position (latitude and longitude) of the vehicle 1A. The GPS receiver 20 outputs absolute position information indicating the calculated absolute position of the vehicle 1A to the controller 100. Also, the GPS receiver 20 calculates a bearing indicating the forward direction of the vehicle 1A, and outputs bearing information indicating the bearing of the vehicle 1A to the controller 100.

The relative bearing detector 30 is provided with an acceleration sensor 31 and a gyro sensor 33. The acceleration sensor 31 detects the acceleration of the vehicle 1A. The gyro sensor 33 is a vibrating gyroscope for example, and detects the relative bearing of the vehicle 1A (for example, the amount of rotation about the yaw axis). The relative bearing detector 30 outputs relative bearing information indicating the detected acceleration and relative bearing of the vehicle 1A to the controller 100.

The sensor group 40 is a device that collects information about objects surrounding the vehicle 1A. For example, a technology that outputs exploration waves in a predetermined range outside the vehicle 1A, such as millimeter-wave radar, LIDAR (Light Detection and Ranging/Laser Imaging Detection and Ranging), or sonar can be adopted as the sensor group 40. Additionally, a vehicle-to-vehicle communication device that bidirectionally communicates with the other vehicle(s) 1B also corresponds to a device that collects information about the other vehicle(s) 1B present near the vehicle 1A, and therefore can be included in the sensor group 40.

The display 50 is provided with a touch panel 55, and is a display device (display) that displays information such as images. The touch panel 55 outputs, to the controller 100, position information indicating a touch position where an occupant's finger or the like has touched the touch panel 55. The controller 100 recognizes the operation content of an operation performed by the occupant from the position information input from the touch panel 55 and information about an image for display generated by the controller 100 (display controller 121).

The imaging unit 60 is provided with a front camera 61, a right side camera 63, a left side camera 65, and rear camera

67. Each of the front camera 61, the right side camera 63, the left side camera 65, and the rear camera 67 is provided with an image sensor such as a charge-coupled device (CCD) sensor or a complementary metal-oxide semiconductor (CMOS) sensor, and images the surroundings of the vehicle 1A, including the road surface, at a predetermined frame rate. The angles of view of the front camera 61, the right side camera 63, the left side camera 65, and the rear camera 67 are adjusted to enable a 360° range centered on the vehicle 1A to be imaged by these four cameras.

The front camera 61 is attached to the front end such as the front grille or to a position such as the back face of a rear-view mirror inside the cabin, for example, and images the area in front of the vehicle 1A, including the road surface. The area in front of the vehicle 1A refers to the area in the direction of the windshield as seen by the driver sitting in the driver's seat.

The right side camera 63 is attached to the right side mirror, for example, and images the area on the right side of the vehicle 1A, including the road surface. The left side camera 65 is attached to the left side mirror, for example, and images the area on the left side of the vehicle 1A, including the road surface.

The rear camera 67 is attached to a position such as near the rear gate release lever or on the rear spoiler, for example, and images the area behind the vehicle 1A, including the road surface. The area behind the vehicle 1A refers to the area in the opposite direction of the area in front of the vehicle 1A, in the direction of the rear window as seen by the driver sitting in the driver's seat.

The number and arrangement of the cameras provided in the imaging unit 60 are an example, and may be freely changed. In other words, insofar as a 360° range centered on the vehicle 1A can be imaged, the number of cameras provided in the vehicle 1A may be increased or decreased.

The auxiliary storage device 70 is a device such as a solid-state drive or a hard disk drive, for example, and stores various types of information including map data 75. The auxiliary storage device 70 may also include a portable storage device such as a Compact Disc (CD) drive, a DVD drive, or a Blu-ray™ Disc (BD) drive.

The map data 75 contains drawing data such as data used to draw road shapes and data used to draw a background such as terrain, for example. The map data 75 also contains information related to route searching, such as node information that includes information related to nodes corresponding to connection points in a road network such as intersections, and link information that includes information related to links corresponding to roads formed between nodes.

The vehicle control unit 200 functions as a "driving controller", and is a device that includes for example, CPU, ROM and RAM, and executes a control program stored in ROM or the like to control, based on information from sensors or the like, driving mechanisms such as the engine, steering, brakes, and transmission to drive the vehicle 1A in accordance with a movement route calculated by the controller 100. The vehicle control unit 200 is connected to the controller 100 through a controller area network (CAN) I/F 80.

The controller 100 is a computer device provided with memory 110 and a processor 120.

The memory 110 is provided with volatile memory such as random access memory (RAM) and non-volatile memory such as ROM and flash memory. The memory 110 stores a control program 111 and parameters 113. The control program 111 is a program executed by the processor 120. The parameters 113 are variables used for edge detection when detecting the marking lines 150 (see FIG. 2) that delineate parking areas from an image taken by the imaging unit 60. Also, the memory 110 stores an overhead image generated by the processor 120.

The processor 120 is a computational processing device including a central processing unit (CPU) or a microcontroller. The processor 120 executes the control program 111 to control each unit of the parking assistance device 10. The processor 120 may be a single processor or a plurality of processors. In addition, the processor 120 may also be a system on a chip (SoC) in which all or part of the memory 110 is integrated with other circuits. Also, the processor 120 may be a combination of a CPU that executes programs and a digital signal processor (DSP) that executes predetermined computational processing. Furthermore, all of the functions of the processor 120 may also be implemented in hardware, and a programmable device may be used.

The controller 100 is provided with the following function blocks: a display controller 121, a communication controller 122, a current position specifier 123, an obstacle detector 124, an image compositor 125, a marking line detector 126, a first determiner 127, a tentative parking position setter 128, a second determiner 129, a parking position setter 130, a drivable area setter 131, and a parking route calculator 132. These function blocks are depicted as blocks to conveniently illustrate functions achieved by the processor 120 executing an instruction set stated in the control program 111 to compute data and control device behavior, but the function blocks do not represent specific pieces of application software or hardware.

The display controller 121 generates an image for display and causes the display 50 to display the generated image for display. For example, the display controller 121 reads out the map data 75 from the auxiliary storage device 70, and on the basis of the read-out map data 75, generates a map image of a predetermined scale centered on the current position as the image for display. The display controller 121 causes the display 50 to display the generated map image.

The communication controller 122 controls data communication with the vehicle control unit 200. The controller 100 is connected to the vehicle control unit 200 through the controller area network (CAN) I/F 80. For example, the communication controller 122 receives information such as the vehicle speed from the vehicle control unit 200, and transmits information indicating a movement route for parking in a target parking position. Besides the vehicle control unit 200, an electric control unit (ECU) that controls the vehicle 1A and sensors are also connected to the CAN I/F 80. The ECU and the sensors are omitted from illustration.

The current position specifier 123 specifies the current position of the vehicle 1A.

The current position specifier 123 specifies the current position of the vehicle 1A on the basis of information such as the absolute position information and bearing information input from the GPS receiver 20, the relative bearing information of the vehicle 1A input from the relative bearing detector 30, the map data 75 read out from the auxiliary storage device 70, and the vehicle speed input from the vehicle control unit 200.

The obstacle detector 124 detects an obstacle and the distance to the obstacle on the basis of detection results from the imaging unit 60 and the sensor group 40.

The obstacle detector 124 detects an obstacle by analyzing an image taken by the imaging unit 60. Also, in the case where the other vehicle 1B is detected as an obstacle, the obstacle detector 124 is also capable of detecting the distance to the other vehicle 1B on the basis of properties such as the size of the other vehicle 1B imaged in the taken image.

Additionally, the obstacle detector 124 detects an obstacle on the basis of a sensing result from the sensor group 40. The obstacle detector 124 causes the sensor group 40 to output exploration waves, and detects an obstacle on the basis of the result of receiving the exploration waves reflecting off the obstacle. The obstacle detector 124 also measures the time from when the exploration waves are output by the sensor group 40 until the reflections of the exploration waves are received, and detects the distance to the obstacle on the basis of the measured time.

Also, if an obstacle is detected, the obstacle detector 124 outputs distance information indicating the direction in which the detected obstacle exists and the distance from the vehicle 1A to the obstacle to the vehicle control unit 200.

The image compositor 125 composites the images taken by each of the front camera 61, the right side camera 63, the left side camera 65, and the rear camera 67 to generate an overhead image looking down over the full perimeter of the vehicle 1A. The image compositor 125 writes the generated overhead image to the memory 110.

The overhead image is generated by converting coordinates in the taken images generated by each of the front camera 61, the right side camera 63, the left side camera 65, and the rear camera 67 according to the imaging direction of each camera, and compositing the converted taken images. Through the coordinate conversion, the coordinates are converted from the independent local coordinates of each camera to global coordinates shared in common among the images taken by the four cameras. For example, the global coordinates are a coordinate system having an origin in the center of the vehicle 1A, such as the center of the front axle or the car's center of gravity for example, with a Y-axis extending to the front and rear and an X-axis extending to the left and right of the vehicle 1A.

The marking line detector 126 performs an edge extraction process for example on the overhead image written to the memory 110, and detects the marking lines 150 delineating one or more parking areas. For example, in many parking lots, the road surface is typically asphalt, and lines of a highly visible color such as white or yellow are used as the marking lines 150. Consequently, a luminance difference occurs between the surface of the road of the parking lot and the marking lines 150. Because the magnitude of the change in luminance based on the luminance difference is within a fixed range, by detecting edges at which the magnitude of the change in luminance is in the fixed range, the marking lines 150 can be detected. Note that the method of detecting the marking lines 150 from the taken images is not limited to a method of detection based on a luminance difference, and may be any publicly available detection method.

In addition, the marking line detector 126 may also detect the marking lines 150 by performing image processing such as pattern matching on the taken images, and performing the edge extraction process on an area where an obstacle such as a vehicle is determined not to exist.

Figure 2:
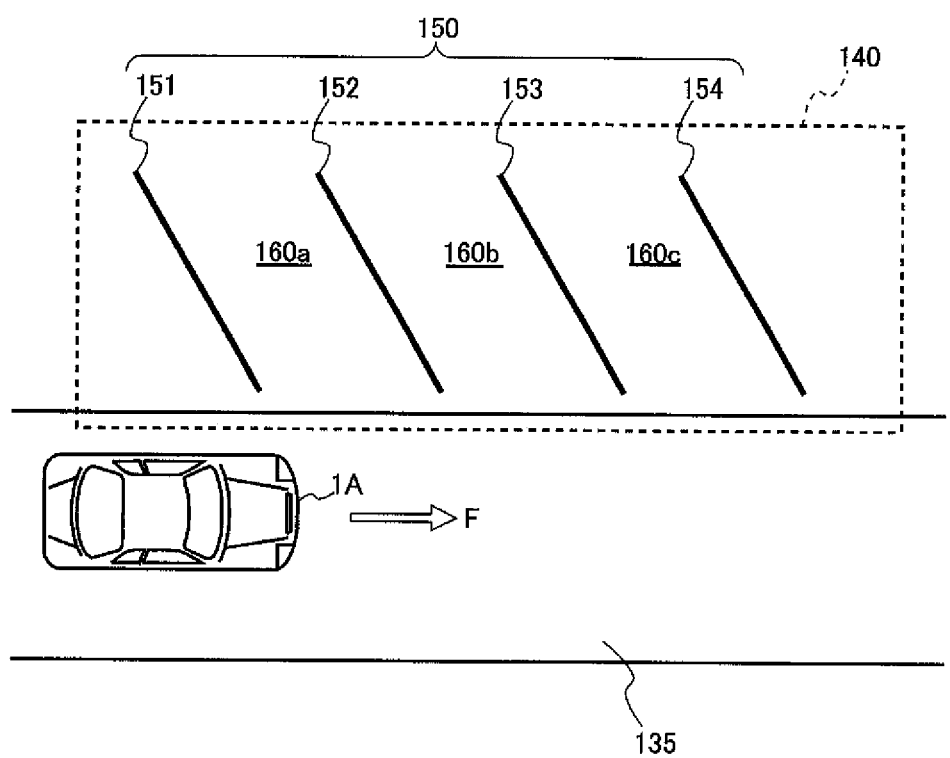
FIG. 2 is a diagram illustrating an imaging range of a left side camera.

FIG. 2 is a diagram illustrating an imaging range 140 of the left side camera 65. Also, FIG. 2 additionally illustrates the vehicle 1A and a lane 135 on which the vehicle 1A is traveling.

The following description assumes that parkable areas 160a, 160b, and 160c exist as the parkable areas 160 on the left side in the forward direction F of the vehicle 1A, and a plurality of marking lines 151, 152, 153, and 154 are detected from the image taken by the left side camera 65. Also, in the following, the marking lines 151 to 154 are collectively referred to as the marking lines 150.

The marking line detector 126 detects the four marking lines 150, namely the marking lines 151, 152, 153, and 154, from the overhead image written to the memory 110, and output coordinate information indicating the position in the overhead image of each detected marking line 150 to the first determiner 127.

The first determiner 127 specifies the parkable areas 160 on the basis of the coordinate information indicating the position of each of the marking lines 150 input from the marking line detector 126, and determines whether or not the type of parking in the case of parking the vehicle 1A in one of the specified parkable areas 160 is parallel parking. The type of parking refers to the way in which a vehicle is parked in one of the parkable areas 160. Types of parking include parallel parking, perpendicular parking, and angle parking.

Figure 3:
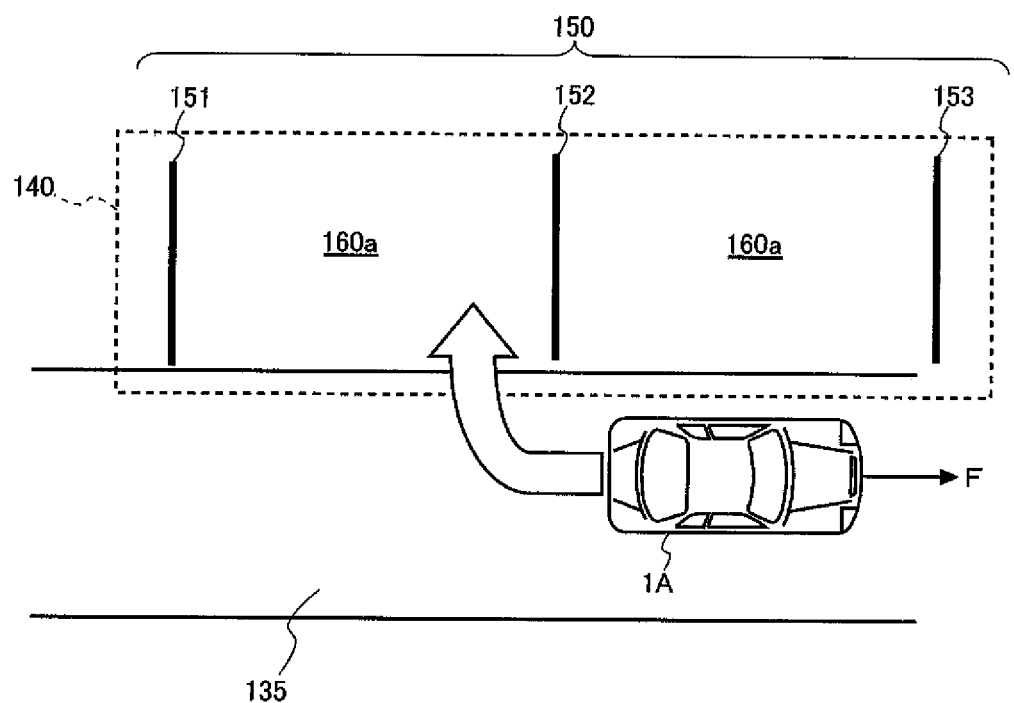
FIG. 3 is a diagram illustrating how parallel parking is performed.
Figure 4:
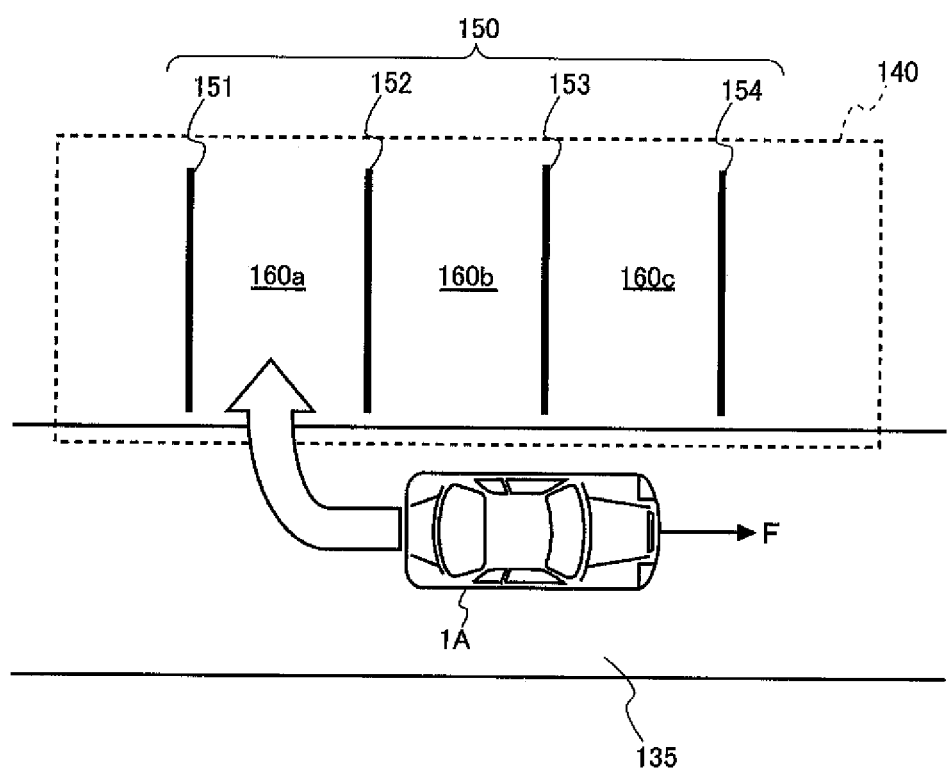
FIG. 4 is a diagram illustrating how perpendicular parking is performed.

FIG. 3 is a diagram illustrating how parallel parking is performed, while FIG. 4 is a diagram illustrating how perpendicular parking is performed. Also, FIGS. 5 and 6 are diagrams illustrating how angle parking is performed.

As illustrated in FIG. 3, parallel parking is a type of parking in which parking areas are arranged alongside the lane 135, and vehicles are parked such that the parked vehicles are aligned in the longitudinal direction of the vehicles.

As illustrated in FIG. 4, perpendicular parking is a type of parking in which a vehicle is parked such that the longitudinal direction of the parked vehicle is substantially orthogonal to the direction of the lane 135 that the parking area faces.

Figure 5:
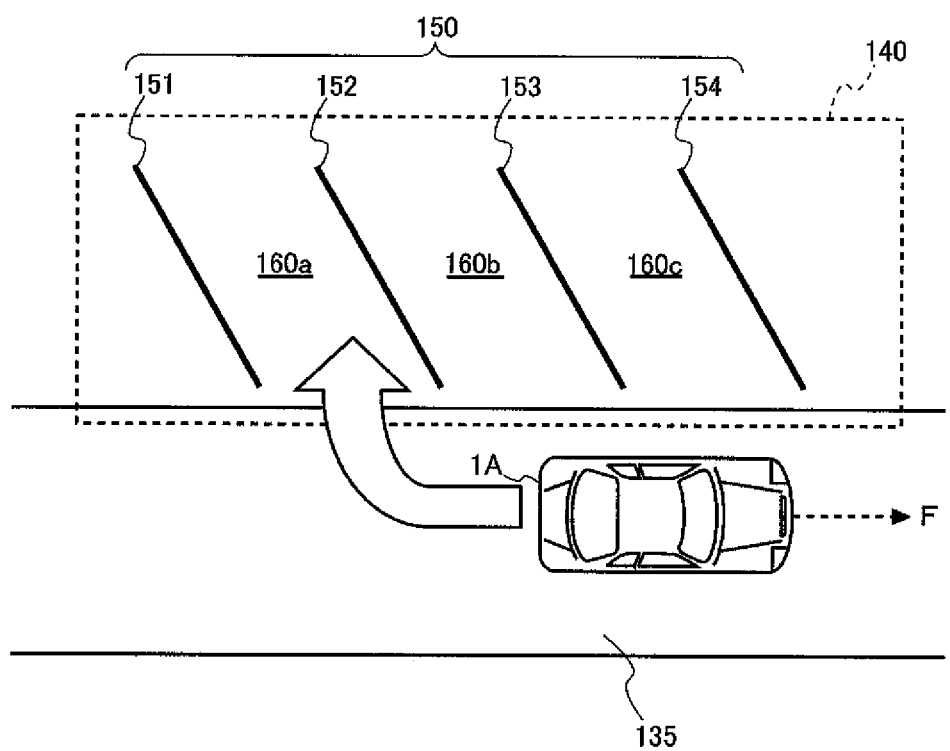
FIG. 5 is a diagram illustrating how angle parking is performed.
Figure 6:
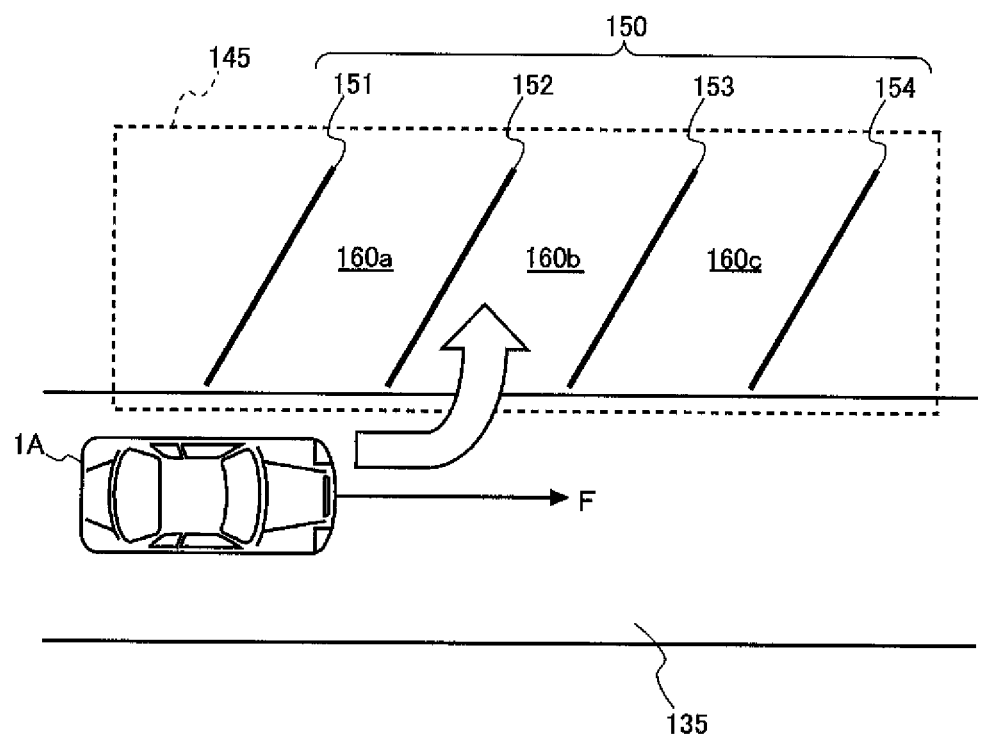
FIG. 6 is a diagram illustrating how angle parking is performed.

As illustrated in FIGS. 5 and 6, angle parking is a type of parking in which a vehicle is parked such that the longitudinal direction of the parked vehicle is oriented diagonally with respect to the direction of the lane 135 that the parking area faces. Furthermore, angle parking includes back-in angle parking, in which a vehicle is backed into the parking area to park as illustrated in FIG. 5, and nose-in angle parking, in which a vehicle is driven forward into the parking area to park as illustrated in FIG. 6.

In the case where parallel parking is determined, the first determiner 127 determines whether or not the distance between the marking lines 150 detected by the marking line detector 126 is longer than a preset distance. In the case where the distance between the detected marking lines 150 is the preset distance or longer, the first determiner 127 determines that the type of parking is parallel parking. Also, in the case where the distance between the detected marking lines 150 is shorter than the preset distance, the first determiner 127 determines that the type of parking is not parallel parking. In the case of parallel parking, the distance between the marking lines 150 is longer than the longitudinal length of the vehicle 1A, like the interval between the marking line 152 and the marking line 153 illustrated in FIG. 3. Accordingly, the first determiner 127 determines whether or not the distance between the marking lines 150 detected by the marking line detector 126 is the preset distance or longer to determine whether or not the type of parking into the parkable area 160 is parallel parking. For the preset distance, a value obtained by adding a predetermined distance to the longitudinal length of the vehicle 1A is used, for example.

Figure 7:
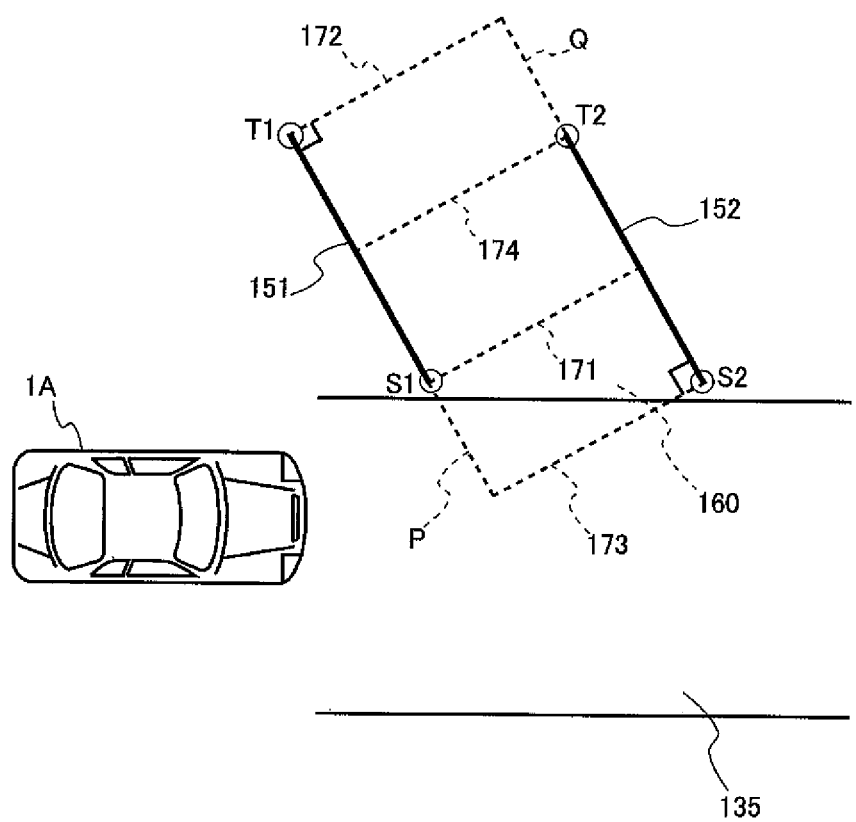
FIG. 7 is a diagram for explaining a method of setting a tentative parking position.
Figure 8:
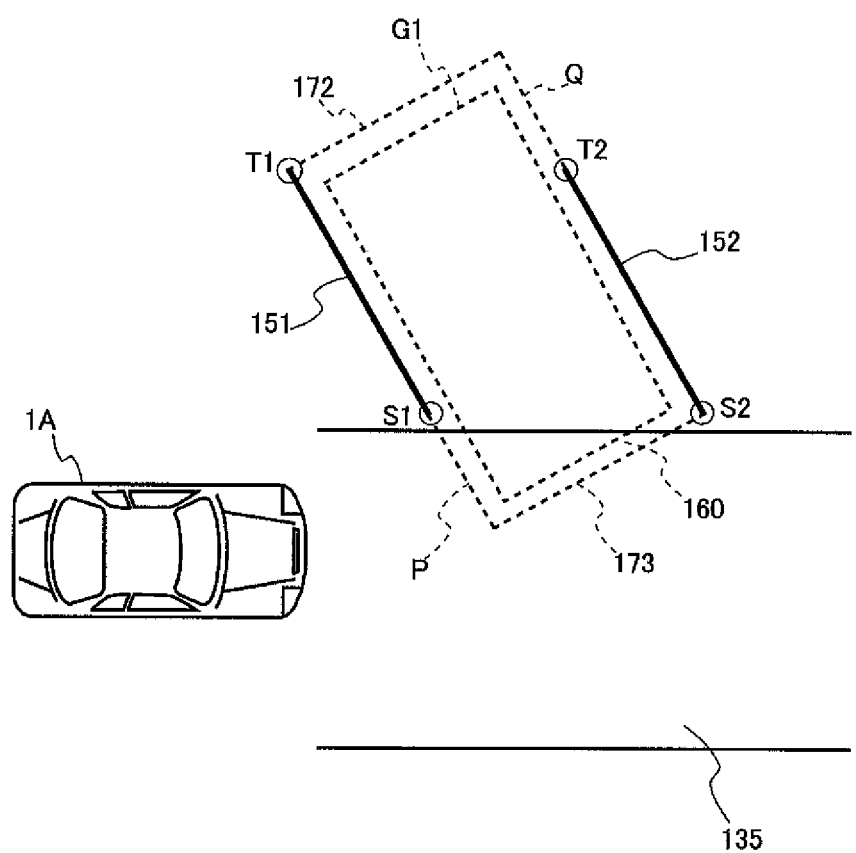
FIG. 8 is a diagram for explaining a method of setting a tentative parking position.

FIGS. 7 and 8 are diagrams for explaining a method of setting a tentative parking position G1.

Next, in the case where the first determiner 127 has determined that the type of parking is not parallel parking, the tentative parking position setter 128 sets a tentative parking position G1. The tentative parking position setter 128 detects the respective endpoints of each of the plurality of marking lines 151 to 154 detected by the marking line detector 126. FIG. 7 illustrates the two marking lines 150, that is, marking lines 151 and 152 and their endpoints from among the marking lines 151 to 154 illustrated in FIG. 2.

First, the tentative parking position setter 128 detects the respective endpoints of the detected marking lines 151 to 154. For example, as illustrated in FIG. 7, assume that an endpoint S1 on the side near the vehicle 1A and an endpoint T1 on the side away from the vehicle 1A are detected as the endpoints of the marking line 151. Also, assume that an endpoint S2 on the side near the vehicle 1A and an endpoint T2 on the side away from the vehicle 1A are detected as the endpoints of the marking line 152.

Next, the tentative parking position setter 128 treats the detected four endpoints S1, T1, S2, and T2 as starting points, and computes auxiliary line segments in the direction orthogonal to the opposed marking lines 150.

The line segment starting at the endpoint S1 and orthogonal to the marking line 152 is denoted the auxiliary line segment 171.

The line segment starting at the endpoint T1 and orthogonal to the marking line 152 is denoted the auxiliary line segment 172.

The line segment starting at the endpoint S2 and orthogonal to the marking line 151 is denoted the auxiliary line segment 173.

The line segment starting at the endpoint T2 and orthogonal to the marking line 151 is denoted the auxiliary line segment 174.

In FIG. 7, a virtual line extending the marking line 151 in the extension direction of the marking line 151 is denoted the virtual line P. Similarly, a virtual line extending the marking line 152 in the extension direction of the marking line 152 is denoted the virtual line Q. The auxiliary line segment 172 is a line segment that starts at the endpoint T1 and ends upon intersection with the virtual line Q. Similarly, the auxiliary line segment 173 is a line segment that starts at the endpoint S2 and ends upon intersection with the virtual line P.

Next, the tentative parking position setter 128 selects the largest rectangular area from among the plurality of rectangular areas formed by the marking lines 151 and 152, the auxiliary line segments 171, 172, 173, and 174, and the virtual lines P and Q, and sets the selected rectangular area as the parkable area 160. In the example illustrated in FIG. 7, the rectangular area formed by the marking line 151 and its extended line (the virtual line P), the auxiliary line segment 172, the marking line 152 and its extended line (the virtual line Q), and the auxiliary line segment 173 is set as the parkable area 160.

Next, the tentative parking position setter 128 sets the tentative parking position G1 in the set parkable area 160. The tentative parking position setter 128 sets a rectangular tentative parking position G1 contained inside the parkable area 160. FIG. 8 illustrates the tentative parking position G1 set inside the parkable area 160.

Figure 9:
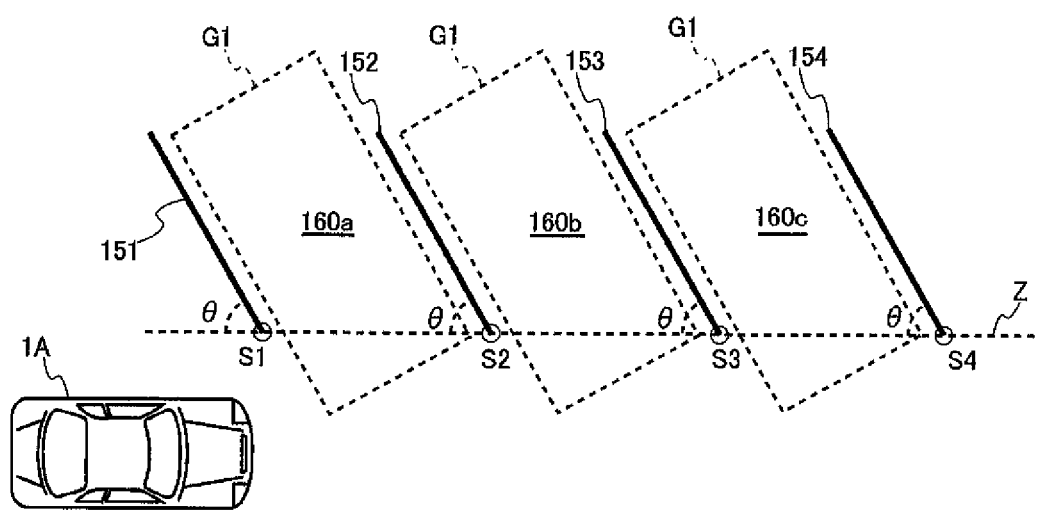
FIG. 9 is a diagram illustrating tentative parking positions.

FIG. 9 is a diagram illustrating an angle formed between a parking baseline Z and the marking lines 150.

The second determiner 129 functions as a "determiner", and calculates a parking baseline Z that corresponds to the "line segment joining the endpoints on the vehicle side of the marking lines". The second determiner 129 computes a line segment joining the endpoints S1, S2, S3, and S4 on the vehicle 1A side of the marking lines 151, 152, 153, and 154 in the overhead image. For example, the second determiner 129 computes the line segment joining the endpoints S1, S2, S3, and S4 according to the least squares method. The computed line segment Z is hereinafter referred to as the parking baseline Z.

After calculating the parking baseline Z, the second determiner 129 calculates an angle θ between the parking baseline Z and the marking lines 150. The second determiner 129 may calculate the angle θ between the parking baseline Z and each of the marking lines 151, 152, 153, and 154, and take the average value as the angle θ, or the second determiner 129 may select one of the marking lines 151, 152, 153, and 154, and calculate the angle θ between the selected marking line 150 and the parking baseline Z. After calculating the angle θ, the second determiner 129 determines, on the basis of the calculated angle θ, whether the type of parking is perpendicular parking or angle parking.

In the case where the computed angle θ is 60°<θ<120°, the second determiner 129 determines that the type of parking is perpendicular parking. Also, in the case where the computed angle θ is 45°≤θ≤60°, the second determiner 129 determines that the type of parking is back-in angle parking. Also, in the case where the computed angle θ is 120°≤θ≤135°, the second determiner 129 determines that the type of parking is nose-in angle parking.

The parking position setter 130 sets a goal parking position G2. In the case where the first determiner 127 has determined that the type of parking is parallel parking, the parking position setter 130 sets the goal parking position G2 inside an area between two adjacent marking lines 150 in which no other vehicle or obstacle exists.

In the case where the second determiner 129 has determined that the type of parking is perpendicular parking, the parking position setter 130 treats the tentative parking position G1 directly as the goal parking position G2, without correcting the tentative parking position G1 set by the tentative parking position setter 128. Also, in the case where the second determiner 129 has determined that the type of parking is nose-in angle parking or back-in angle parking, the parking position setter 130 corrects the tentative parking position G1 set by the tentative parking position setter 128 to set the goal parking position G2.

Figure 10:
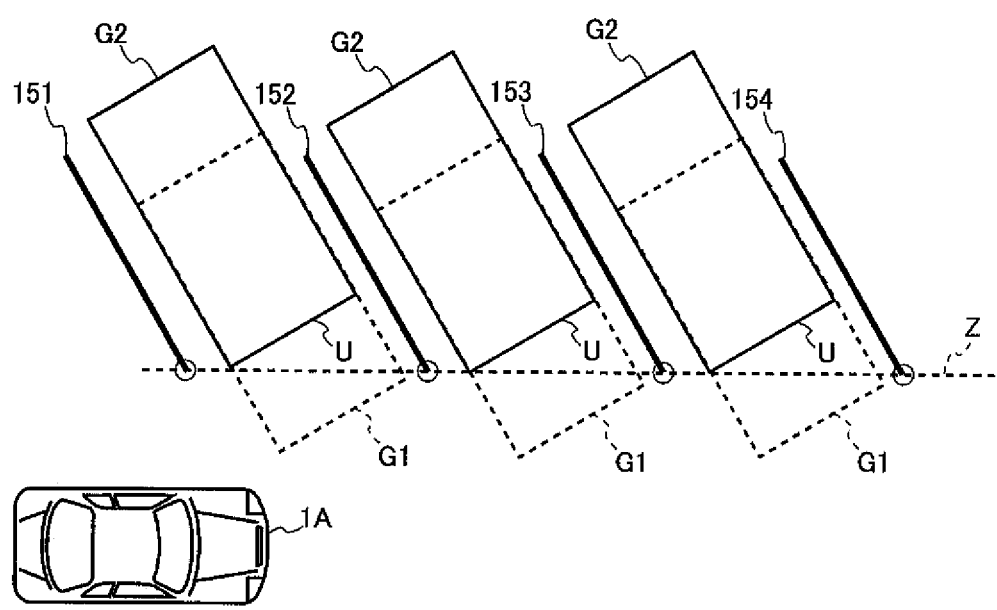
FIG. 10 is a diagram illustrating corrected parking positions.

FIG. 10 is a diagram illustrating the goal parking position G2 obtained by correcting the tentative parking position G1.

The parking position setter 130 corrects the position of the tentative parking position G1 to set the goal parking position G2 such that, of the four sides of the rectangular goal parking position G2, a side U that faces the lane 135 does not overlap the parking baseline Z and is positioned farther away from the vehicle 1A than the parking baseline Z. The width and length of the goal parking position G2 is the same as the width and length of the tentative parking position G1.

Figure 11:
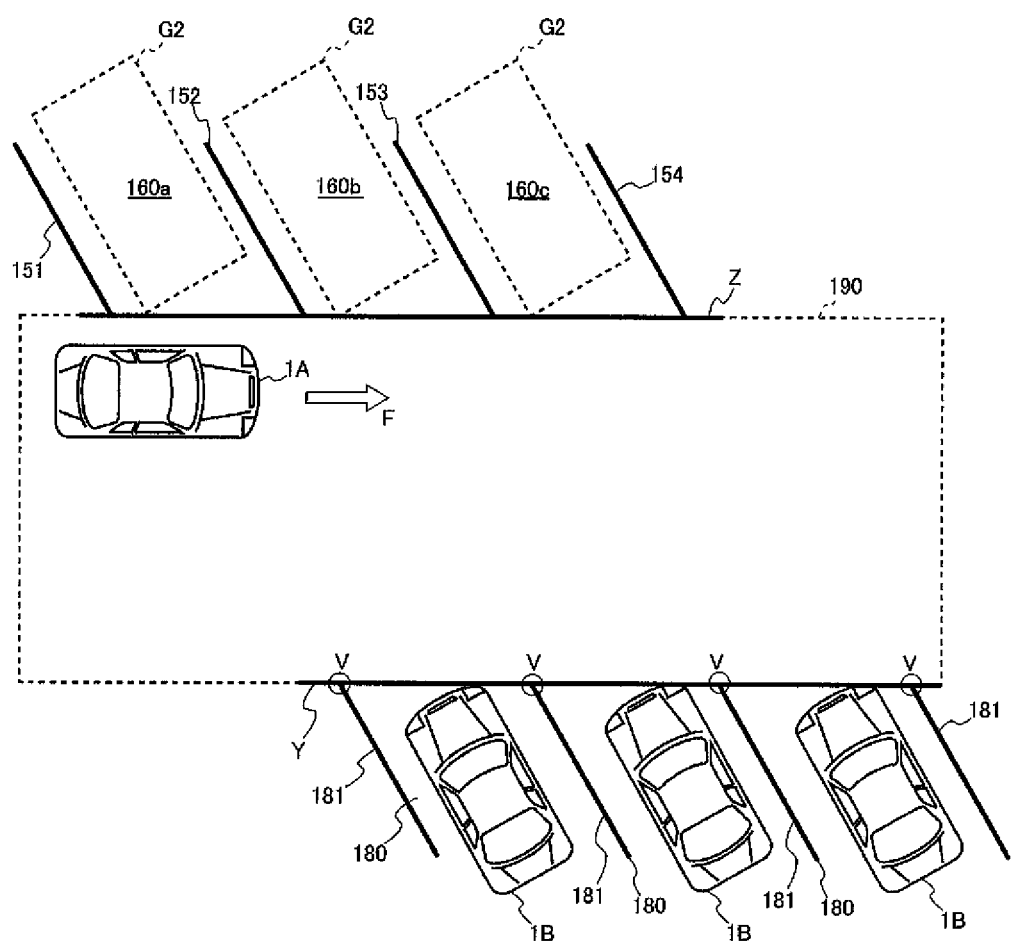
FIG. 11 is a diagram illustrating a drivable area.

FIG. 11 is a diagram illustrating a drivable area 190.

The drivable area setter 131 sets the drivable area 190, which is an area in which the vehicle 1A can be driven by self-driving to park the vehicle 1A in the goal parking position G2. The drivable area 190 corresponds to a "driving area" according to an aspect of the present invention.

For example, the drivable area 190 is a rectangular area as illustrated in FIG. 11, and in the case where the other vehicle 1B does not exist in the lane 135, the size of the drivable area 190 in the direction parallel to the forward direction F of the vehicle 1A may be set freely up to a preset upper limit value.

In addition, on the basis of images taken by the imaging unit 60 and detection results from the sensor group 40, the drivable area setter 131 determines whether or not one or more other vehicles 1B are parked in parking areas 180 opposite the parkable areas 160 across the lane 135. In the case where one or more other vehicles 1B are not parked in the parking areas 180, the drivable area setter 131 may set a range including the parking areas 180 as the drivable area 190, and furthermore may also detect respective endpoints V of a plurality of marking lines 181 delineating the parking areas 180, and set the drivable area 190 on the basis of a line segment Y joining the detected endpoints V. In other words, assuming that the forward direction F of the vehicle 1A is to the front, the range of the right edge of the drivable area 190 is set on the basis of the line segment Y.

Also, in the case where one or more other vehicles 1B are parked in the parking areas 180, the drivable area setter 131 may also set the drivable area 190 on the basis of the distance to the detected other vehicle(s) 1B. The example illustrated in FIG. 11 illustrates a case in which, assuming the forward direction F of the vehicle 1A is to the front, the range of the right edge of the drivable area 190 is set on the basis of the distance to the other vehicles 1B detected using taken images and the sensor group 40.

Figure 12:
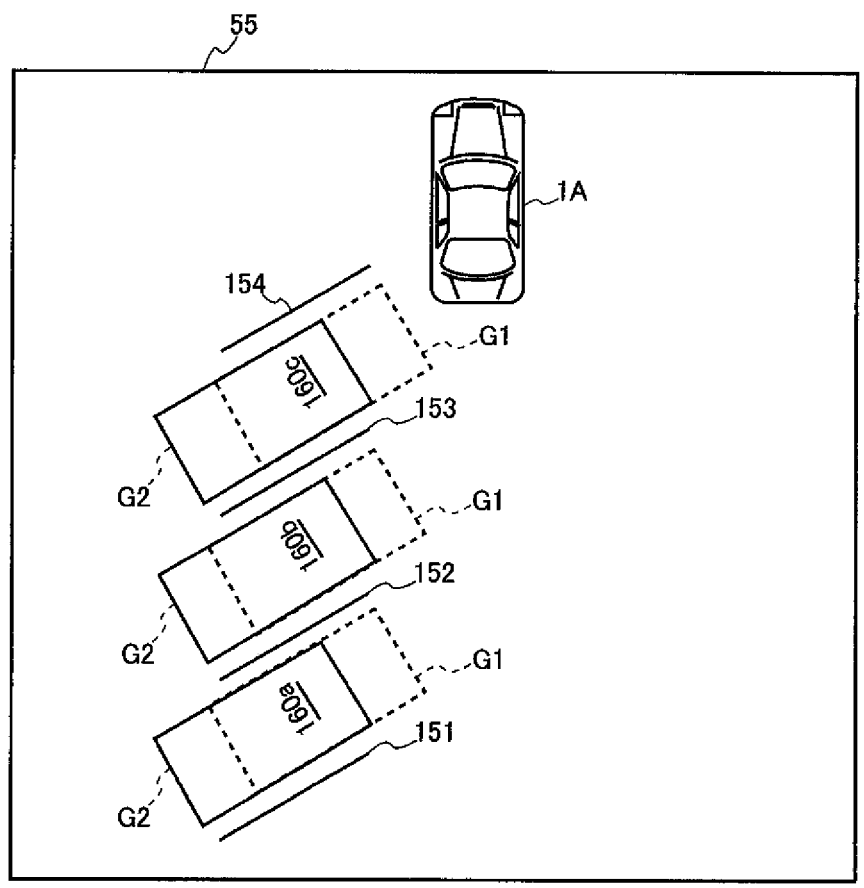
FIG. 12 is a diagram illustrating an exemplary display in a case where a plurality of parkable ranges are detected.

FIG. 12 is a diagram illustrating an exemplary display by the display 50.

In the case where multiple parkable areas 160 are detected and multiple goal parking positions G2 are set by the parking position setter 130, the display controller 121 causes the display 50 to display the image for display illustrated in FIG. 12, prompting a user to select one of the multiple set goal parking positions G2. From the overhead image written to the memory 110, the display controller 121 extracts the image portion capturing the parkable areas 160, and causes the display 50 to display the extracted image as the image for display. Additionally, the display controller 121 overlays a graphic or icon representing the vehicle 1A on the image extracted from the overhead image. Furthermore, as illustrated in FIG. 12, the display 50 may also display the tentative parking positions G1 set by the tentative parking position setter 128 and the goal parking positions G2 corrected by the parking position setter 130.

If the user performs a touch operation on the touch panel 55 to select one of the parkable areas 160, the parking route calculator 132 calculates a movement route for parking in the goal parking position G2 of the selected parkable area 160. The parking route calculator 132 calculates a movement route for driving the vehicle 1A inside the drivable area 190 and parking the vehicle 1A in the selected goal parking position G2 on the basis of the current position of the vehicle 1A and the goal parking position G2 set in the selected parkable area 160. Methods of calculating the movement route are publicly available, and the movement route may be calculated according to any publicly available method.

Figure 13:
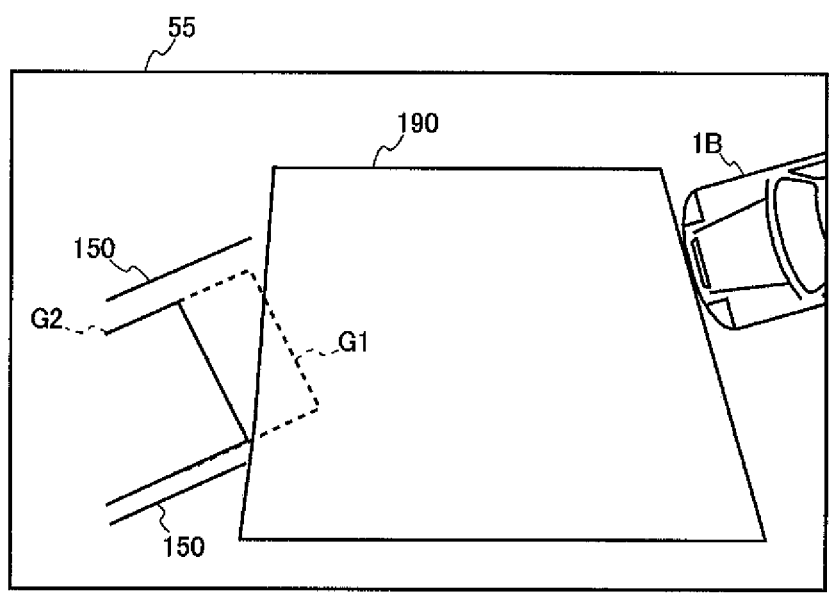
FIG. 13 is a diagram illustrating an exemplary display of a drivable area.

FIG. 13 is a diagram illustrating an exemplary display by the display 50.

FIG. 13 is a diagram illustrating an example of an image displayed on the display 50 when the vehicle 1A starts moving to the goal parking position G2 under control by the vehicle control unit 200. In this exemplary display, the drivable area 190 set by the drivable area setter 131, the tentative parking position G1, and the goal parking position G2 are displayed.

Figure 14:
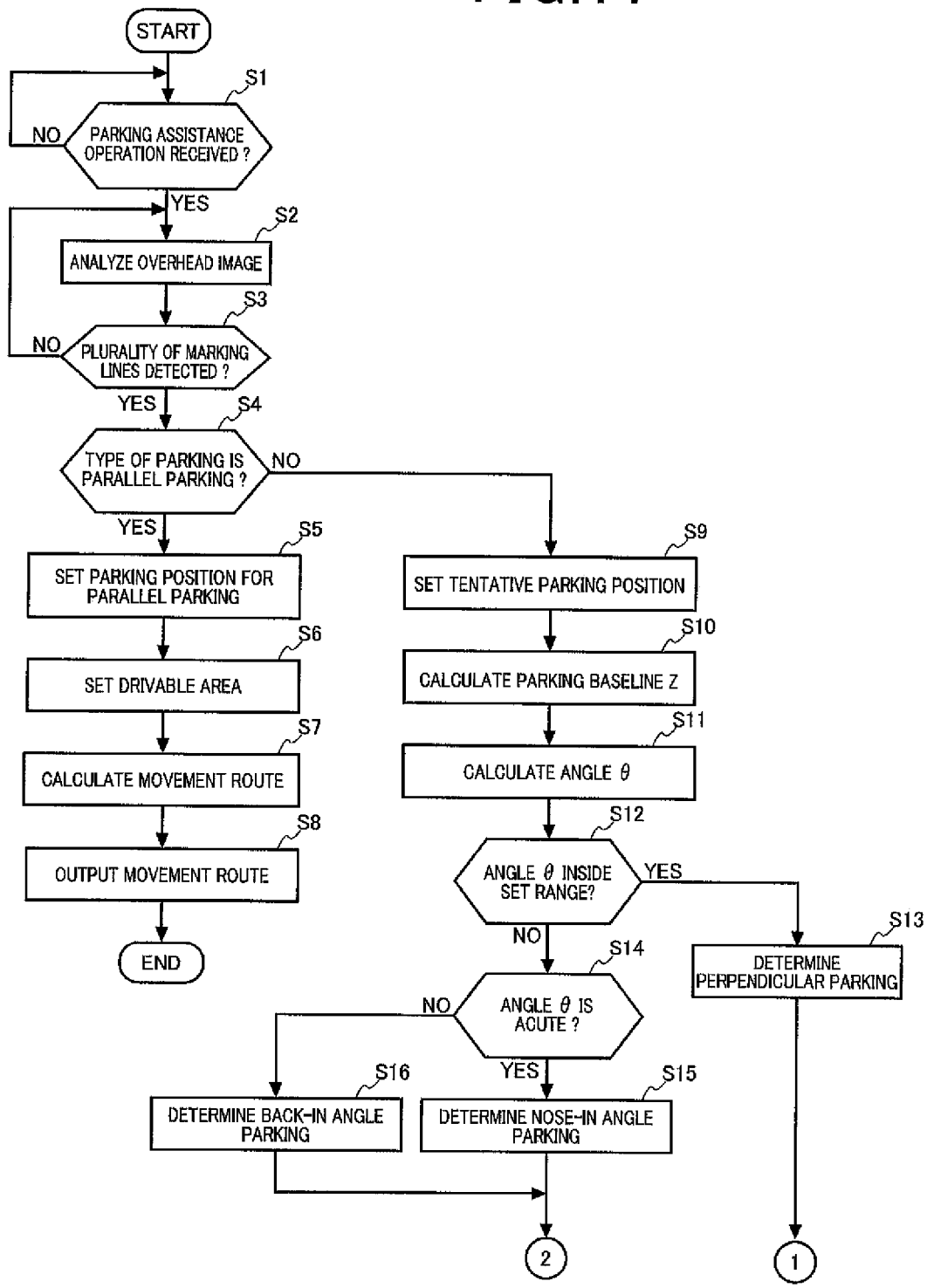
FIG. 14 is a flowchart illustrating operations by the parking assistance device.
Figure 15:
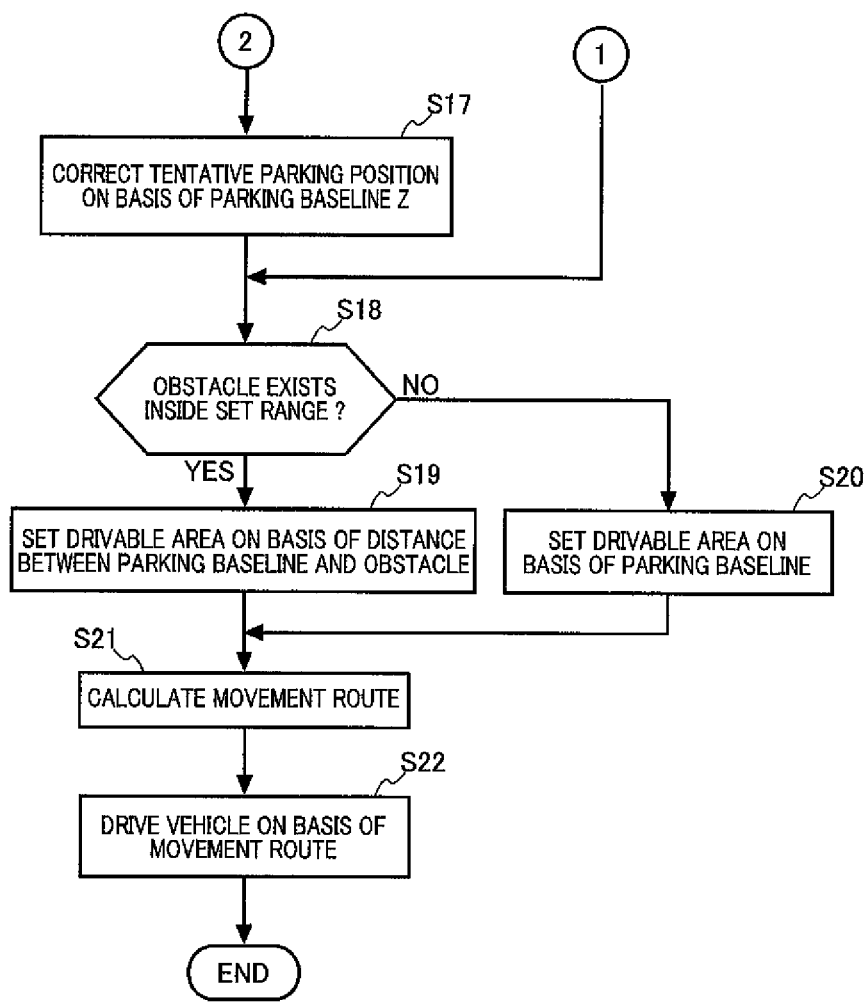
FIG. 15 is a flowchart illustrating operations by the parking assistance device.

FIGS. 14 and 15 are flowcharts illustrating operations by the parking assistance device 10.

Operations by the parking assistance device 10 will be described while referring to FIGS. 14 and 15.

First, the controller 100 determines whether or not an operation of starting parking assistance has been received (step S1). In the case where the operation of starting parking assistance has not been received (step S1/NO), the controller 100 stands by until the starting operation is received.

In the case where the operation of starting parking assistance has been received (step S1/YES), the controller 100 causes each camera of the imaging unit 60 to start imaging. The process by which the controller 100 causes the imaging unit 60 to start imaging corresponds to an "imaging step" according to an aspect of the present invention. Each camera of the imaging unit 60 performs imaging at a predetermined frame rate, and outputs a taken image to the controller 100. The taken images are temporarily stored in the memory 110. Also, the taken images are subjected to a coordinate conversion according to the imaging direction of each camera, and composited into an overhead image.

The controller 100 analyzes the overhead image written to the memory 110 (step S2), and detects a plurality of marking lines 150. In the case where a plurality of marking lines 150 are not detected successfully (step S3/NO), the controller 100 returns to step S2 and analyzes the next overhead image written to the memory 110. Step S3 corresponds to a "detecting step" according to an aspect of the present invention.

Also, in the case of detecting the marking lines 150 from the taken images (step S3/YES), the controller 100 compares the distance between the detected marking lines 150 to a preset distance, and determines whether or not the type of parking is parallel parking (step S4). In the case where the distance between the detected marking lines 150 is the preset distance or longer, the controller 100 determines that the type of parking is parallel parking. In the case of determining that the type of parking is parallel parking (step S4/YES), the controller 100 sets the goal parking position G2 inside an area between two adjacent marking lines 150 in which no other vehicle or obstacle exists (step S5).

Next, the controller 100 sets the drivable area 190 (step S6). The controller 100 determines whether or not an obstacle exists inside a predetermined range from the vehicle 1A on the basis of the images taken by the imaging unit 60 and detection results from the sensor group 40. Examples of obstacles include the other vehicle 1B parked in the parking area, and structures such as poles or pillars in the parking lot. In the case of detecting an obstacle, the controller 100 sets the drivable area 190 on the basis of the detected obstacle and the marking lines 150.

Next, the controller 100 calculates a movement route for moving the vehicle 1A inside the drivable area 190 from the current position to the goal parking position G2 set in step S5 (step S7). The controller 100 calculates a movement route and outputs the calculated movement route to the vehicle control unit 200 (step S8). When the movement route is input from the controller 100, the vehicle control unit 200 controls driving mechanisms such as the engine, brakes, steering, and transmission to drive the vehicle 1A in accordance with the input movement route. At this point, in the case where an obstacle is detected through sensing by the sensor group 40, distance information indicating the direction in which the detected obstacle exists and the distance to the obstacle is input into the vehicle control unit 200. On the basis of the input information, the vehicle control unit 200 drives the vehicle 1A while avoiding the obstacle, and parks the vehicle 1A in the goal parking position G2.

Also, in the determination of step S4, in the case of determining that the type of parking is not parallel parking (step S4/NO), the controller 100 sets the tentative parking position G1 (step S9). The controller 100 detects the endpoints of the detected marking lines 150, and on the basis of the detected endpoints, sets the maximum rectangular area delineated by the marking lines 150 as the parkable area 160.

Additionally, the controller 100 sets the tentative parking position G1 contained inside the set parkable area 160.

Next, the controller 100 calculates the parking baseline Z (step S10). The controller 100 detects the endpoints on the vehicle 1A side of the detected plurality of marking lines 150 (the endpoints S1, S2, S3, and S4 illustrated in FIG. 9), and uses the least squares method to compute the parking baseline Z joining the detecting endpoints (step S10). Next, the controller 100 calculates the angle θ obtained between the computed parking baseline Z and the plurality of marking lines 150 (step S11).

The controller 100 calculates the angle θ obtained between the forward direction F and the parking baseline Z, and determines whether or not the calculated angle θ is an angle inside a preset range (step S12). In this flowchart, a case is described in which the set range of the angle for determining perpendicular parking is specifically 60°<θ<120°. In the case where the calculated angle θ is inside the set range (step S12/YES), the controller 100 determines that the type of parking is perpendicular parking (step S13), and proceeds to step S18. On the other hand, in the case where the calculated angle θ is not inside the set range (step S12/NO), the controller 100 determines that the type of parking is angle parking. Step S12 corresponds to a "determining step" according to an aspect of the present invention.

Also, in the case of determining that the type of parking is angle parking (step S12/NO), the controller 100 additionally determines whether or not the angle θ is an acute angle (step S14). In the case where the angle θ is an acute angle (step S14/YES), specifically the case where 45°≤θ≤60°, the controller 100 determines that the type of parking is nose-in angle parking (step S15). Also, in the case where the angle θ is not an acute angle (step S14/NO), specifically the case where 120°≤θ≤135°, the controller 100 determines that the type of parking is back-in angle parking (step S16).

Next, the controller 100 corrects the position of the tentative parking position G1 set in step S9 on the basis of the parking baseline Z, and sets the goal parking position G2 (step S17). For example, as illustrated in FIG. 10, the controller 100 corrects the tentative parking position G1 to set the goal parking position G2 such that the side U of the goal parking position G2 does not overlap the parking baseline Z and is positioned farther away from the vehicle 1A than the parking baseline Z. Step S17 corresponds to a "setting step" according to an aspect of the present invention.

After setting the goal parking position G2, the controller 100 sets the drivable area 190. First, the controller 100 determines whether or not an obstacle exists inside a preset range from the vehicle 1A (step S18). The controller 100 detects the direction in which the obstacle exists and the distance to the obstacle on the basis of the images taken by the imaging unit 60 and the detection results from the sensor group 40.

In the case where an obstacle is not detected inside the preset range (step S18/NO), the controller 100 sets a rectangular area of preset size as the drivable area 190 on the basis of the parking baseline Z (step S20). The controller 100 sets the drivable area 190 such that, of the four sides of the drivable area 190, the side near the goal parking position G2 is an extension of the parking baseline Z.

On the other hand, in the case where an obstacle is detected inside the preset range (step S18/YES), the controller 100 sets the drivable area 190 on the basis of the parking baseline Z and the distance to the detected obstacle (step S19). At this time, the controller 100 sets the drivable area 190 such that, of the four sides of the drivable area 190, the side near the goal parking position G2 is an extension of the parking baseline Z. Additionally, in the case where one or more other vehicles 1B are detected in the parking areas 180 opposite the parkable areas 160 across the lane 135, the controller 100 may set the range on the other vehicle 1B side of the drivable area 190 on the basis of the distance to the other vehicle(s) 1B.

Next, the controller 100 calculates a movement route inside the drivable area 190 for moving the vehicle 1A to the goal parking position G2 (step S21). After calculating the movement route, the controller 100 outputs the calculated movement route and coordinate information indicating the goal parking position G2 to the vehicle control unit 200. The vehicle control unit 200 controls the driving of the vehicle 1A on the basis of the movement route and the coordinate information of the goal parking position G2 input from the controller 100, and moves the vehicle 1A to the goal parking position G2 (step S22). Step S22 corresponds to a "self-driving step" according to an aspect of the present invention.

As described above, the parking assistance device 10 according to the present embodiment is provided with the imaging unit 60, the marking line detector 126, the second determiner 129, and the parking position setter 130.

The marking line detector 126 detects a plurality of marking lines 150 delineating a parking area from an image taken by the imaging unit 60.

The second determiner 129 determines whether or not the type of parking for parking the vehicle 1A in the parkable area 160 is angle parking, on the basis of the angle obtained between the parking baseline Z joining the endpoints on the vehicle 1A side of the detected marking lines 150 and the plurality of marking lines, or the angle obtained between one marking line selected from among the plurality of marking lines and the parking baseline Z.

In the case where the second determiner 129 determines that the type of parking corresponds to angle parking, the parking position setter 130 sets the goal parking position G2 inside the parkable area 160 in which to park the vehicle 1A, on the basis of the parking baseline Z.

Consequently, the vehicle 1A can be parked without sticking out from the parking area, even in the case of performing angle parking by self-driving.

The parking position setter 130 sets a parking position inside the parking area delineated by the marking lines 150 at a position farther away from the vehicle 1A than the parking baseline Z.

Consequently, the vehicle 1A can be parked without sticking out from the parking area.

Also, in the case where the angle obtained between the marking lines and the parking baseline Z is at least 45° and not more than 60°, the second determiner 129 determines that the type of parking is angle parking that parks the vehicle 1A back-in at an angle.

Also, in the case where the angle obtained between the marking lines and the parking baseline Z is at least 120° and not more than 135°, the second determiner 129 determines that the type of parking is angle parking that parks the vehicle 1A nose-in at an angle.

Consequently, angle parking can be determined precisely.

The parking assistance device 10 is provided with the vehicle control unit 200 that drives the vehicle 1A automatically. Additionally, the parking assistance device 10 is provided with the drivable area setter 131.

The drivable area setter 131 detects, on the basis of images taken by the imaging unit 60, the distance between the vehicle 1A and one or more vehicles parking in the opposite parking area to the parking area across the lane 135 where the vehicle 1A is positioned. The drivable area setter 131 decides the drivable area for parking the vehicle 1A in the parking area on the basis of the distance between the parking baseline Z and the other vehicle 1B parking in the opposite parking area.

The vehicle control unit 200 drives the vehicle 1A inside the drivable area set by the drivable area setter 131, and parks the vehicle 1A at the parking position.

Consequently, the vehicle 1A can be parked in the parking area by self-driving, without colliding into an obstacle such as the other vehicle 1B.

The embodiment described above is merely an example of an aspect of the present invention, and may be freely modified and adapted without departing from the gist of the present invention.

For example, FIG. 1 is a schematic diagram in which the configuration of the parking assistance device 10 is classified by the major processing content to facilitate understanding of the present invention, but the configuration of the parking assistance device 10 may be classified further into more configuration elements according to the processing content. Additionally, the configuration of the parking assistance device 10 may also be classified such that a single configuration element executes even more processes.

Furthermore, in the case of using a computer to realize the parking assistance method of the present invention, a program causing the computer to execute the parking assistance method may be configured as a recording medium, or as a transmission medium that transmits the program. For the recording medium, a magnetic and/or optical recording medium or semiconductor memory may be used. Specifically, the recording medium may be a portable or fixed recording medium such as a flexible disk, a hard disk drive (HDD), a Compact Disc-Read-Only Memory (CD-ROM), a DVD, a Blu-ray Disc, a magneto-optical disc, flash memory, or a memory card. Furthermore, the recording medium may also be a non-volatile storage device such as RAM, ROM, or an HDD provided in the parking assistance device 10.

Also, for example, the units of processing in the flowcharts illustrated in FIGS. 14 and 15 are divided according to the major processing content to facilitate understanding of the processing by the parking assistance device 10, but the present invention is not limited by the method of division or the names of the units of processing. The processing by the parking assistance device 10 may be divided into even more units of processing according to the processing content. Furthermore, one unit of processing may be subdivided into even more processes.

REFERENCE SIGNS LIST 1A vehicle
1B other vehicle
10 parking assistance device
20 GPS receiver
21 GPS antenna
30 relative bearing detector
31 acceleration sensor
33 gyro sensor
40 sensor group
55 touch panel
60 imaging unit
61 front camera
63 right side camera
65 left side camera
67 rear camera
70 auxiliary storage device
75 map data
80 CAN I/F
100 controller
110 memory
111 control program
113 parameters
120 processor
122 communication controller
123 current position specifier
124 obstacle detector
125 image compositor
126 marking line detector
127 first determiner
128 tentative parking position setter
129 second determiner
130 parking position setter
131 drivable area setter
132 parking route calculator
135 lane
140 imaging range
150 to 154 marking line
160 parkable area
160a parkable area
160b parkable area
160c parkable area
171 to 174 auxiliary line segment
180 parking area
181 marking line
190 drivable area
200 vehicle control unit
F forward direction
G1 tentative parking position
G2 goal parking position
P virtual line P
Q virtual line Q

What is claimed is:

1. A parking assistance device comprising:
a processor; and
a camera installed in a vehicle, that takes an image of a road surface around the vehicle,
wherein the processor
detects a plurality of marking lines delineating a parking area arranged alongside a lane on which the vehicle is traveling from the image taken by the camera;
determines whether or not a type of parking for parking the vehicle in the parking area is angle parking, on a basis of an angle obtained between a parking baseline, which is a line segment joining endpoints on a vehicle side of the plurality of marking lines detected from the image taken by the camera, and the plurality of marking lines, or an angle obtained between the parking baseline and one marking line selected from among the plurality of marking lines; and
sets a goal parking position in order not to overlap the parking baseline and become a position farther away from the vehicle than the position of the parking baseline based on a determination result of which the type of parking is angle parking, wherein
the processor further sets a rectangular tentative parking position contained by four endpoints of opposed marking lines as starting points, auxiliary line segments in the direction orthogonal to the opposed marking lines or virtual lines extending the marking lines in an extension direction, wherein the processor sets a rectangular goal parking position by correcting the tentative parking position based on a determination of which the parking area is the angle parking, and sets the goal parking position such that, among the four sides of the goal parking position, a side that faces the lane does not overlap the parking baseline and is positioned farther away from the vehicle than the position of the parking baseline.

2. The parking assistance device according to claim 1, wherein the processor determines that the type of parking is angle parking that parks the vehicle back-in at an angle based on a determination result of which the angle obtained between the parking baseline detected from the image taken by the camera and the marking lines is at least 45° and not more than 60°, and determines that the type of parking is angle parking that parks the vehicle nose-in at an angle based on a determination result of which the angle obtained between the parking baseline and the marking lines is at least 120° and not more than 135°.

3. The parking assistance device according to claim 1, wherein the processor further automatically drives the vehicle;

detects, on a basis of the image taken by the camera, a distance between the vehicle and another vehicle parked in an opposite parking area to the parking area across a lane where the vehicle is positioned, and decides a driving area for parking the vehicle in the parking area on a basis of a distance between the line segment and the other vehicle parked in the opposite parking area, and drives the vehicle inside the driving area set by the parking position setter, and parks the vehicle at the parking position.

4. A parking assistance method comprising:

taking an image of a road surface around a vehicle with a camera installed in the vehicle;

detecting a plurality of marking lines delineating a parking area arranged alongside a lane from the image taken by the camera;

determining whether or not a type of parking for parking the vehicle in the parking area is angle parking, on a basis of an angle obtained between a parking baseline, which is a line segment joining endpoints on a vehicle side of the plurality of marking lines detected from the image taken by the camera, and the plurality of marking lines, or an angle obtained between the parking baseline and one marking line selected from among the plurality of marking lines; and setting a goal parking position in order not to overlap the parking baseline and become a position farther away from the vehicle than the position of the parking baseline based on a determination result of which the type of parking into the parking area is angle parking;

setting a rectangular tentative parking position contained by four endpoints of opposed marking lines as starting points, auxiliary line segments in the direction orthogonal to the opposed marking lines or virtual lines extending the marking lines in an extension direction;

setting a rectangular goal parking position by correcting the tentative parking position based on a determination of which the parking area is the angle parking; and setting the goal parking position such that, among the four sides of the goal parking position, a side that faces the lane does not overlap the parking baseline and is positioned farther away from the vehicle than the position of the parking baseline.

5. The parking assistance method according to claim 4, wherein in the determining step, the type of parking is determined to be angle parking that parks the vehicle back-in at an angle based on a determination result of which the angle obtained between the parking baseline detected from the image taken by the camera and the marking lines is at least 45° and not more than 60°, and the type of parking is determined to be angle parking that parks the vehicle nose-in at an angle based on a determination result of which the angle obtained between the parking baseline and the marking lines is at least 120° and not more than 135°.

6. The parking assistance method according to claim 4, wherein in the setting step, a distance between the vehicle and another vehicle parked in an opposite parking area to the parking area across a lane where the vehicle is positioned is detected on a basis of the image taken by the camera, and a driving area for parking the vehicle in the parking area is decided on a basis of a distance between the line segment and the other vehicle parked in the opposite parking area, and the parking assistance method further comprises:

self-driving the vehicle inside the driving area set in the setting step, and parking the vehicle at the parking position.

* * * * *